United States Patent [19]

Karasawa et al.

[11] Patent Number: 4,988,857
[45] Date of Patent: Jan. 29, 1991

[54] MISCONVERGENCE MEASURING APPARATUS

[75] Inventors: Takumi Karasawa, Sakura; Michio Tsukii; Takashi Atobe, both of Mobara; Takaaki Ishikawa, Sakura; Kazuhiko Mizuno, Kashiwa, all of Japan

[73] Assignee: Hitachi, Ltd., Tokyo, Japan

[21] Appl. No.: 347,216

[22] Filed: May 4, 1989

[30] Foreign Application Priority Data

May 6, 1988 [JP] Japan .................................. 63-108984
Jun. 22, 1988 [JP] Japan .................................. 63-152284
Aug. 31, 1988 [JP] Japan .................................. 63-214978
Sep. 16, 1988 [JP] Japan .................................. 63-229957

[51] Int. Cl.$^5$ .................................................. G01J 1/32
[52] U.S. Cl. ........................................ 250/205; 324/404
[58] Field of Search .......................... 250/205, 203.5; 324/403, 404, 407; 356/300, 372; 315/368; 313/413; 335/211

[56] References Cited

U.S. PATENT DOCUMENTS

| 3,188,477 | 6/1965 | Ault .................................. 250/203.5 |
| 4,602,272 | 7/1986 | Duschl .................................. 324/404 |
| 4,674,877 | 6/1987 | Bullinga .................................. 356/300 |
| 4,894,593 | 1/1990 | Barten .................................. 335/211 |

OTHER PUBLICATIONS

Peter G. J. Barten, Spot Size and Current Density Distribution of CRT's, Japan Display '83, Oct. 3-5, 1983, Kobe, Japan, pp. 280-283. Shingo Yamamoto-Automatic Purity and Convergence Adjustment System of Color Tubes IE77-72-1978.

Primary Examiner—Davis L. Willis
Assistant Examiner—Que Tan Le
Attorney, Agent, or Firm—Antonelli, Terry, Stout & Kraus

[57] ABSTRACT

This invention is concerned with apparatus for automatically measuring misconvergence in the production of color Braun tubes or color display apparatus using color Braun tubes. This misconvergence measuring apparatus includes a photoelectric transducer of split light-sensitive structure which is disposed in front of the phosphor screen of a color Braun tube with a deflection yoke mounted, a deflection source for supplying to the deflection yoke a waveform for deflecting the electron beams of the color Braun tube by a constant unit at a time, and a control unit for detecting the excited bright position on the phosphor screen at which the photoelectric transducer produces the maximum output and for controlling the deflection source, whereby the output of the photoelectric transducer is measured for the respective three primary colors of red R, green G, blue B or color differences G-B, B-R and R-G, and when the maximum value or centroid position of each color or color difference is obtained, the desired amounts of horizontal and vertical misconvergence are automatically measured from the positional differences of horizontal and vertical deflection. Moreover, a maximum output detection circuit for a color Braun tube is provided in which the output waveform from the photoelectric transducer is clearly derived in the form of an approximately normal distribution by use of focus potential change.

14 Claims, 11 Drawing Sheets

MISCONVERGENCE MEASURING APPARATUS

BACKGROUND OF THE INVENTION

This invention relates to misconvergence measuring apparatus suitable for use in automatic convergence adjustment in the production of color Braun tubes or color display apparatuses using color Braun tubes.

The process of producing color Braun tubes or color display apparatuses using Braun tubes includes the operation of color adjustment in which for the reproduction of the original color the electron beams for the three primary colors are adjusted to be converged over all the display screen. This adjustment is usually called the convergence adjustment.

The automation of the convergence adjustment operation was published in, for example, the Institute of Electronics and Communication Engineers of Japan, Technical Report IE 77-72, 1978, titled "Development of Color Braun Tube Purity Convergence Automatic Adjustment Apparatus".

In this report, a cross-hatched test pattern supplied to a color Braun tube is colored in red, blue and green in turn by switching the cathodes of the color Braun tube, and the displayed images of the test pattern are projected in a camera where the amount of color shift of the images, or the amount of misconvergence, is measured from the time difference from the synchronizing signal to the longitudinal or lateral detection signal. Also, in this report, the purity of the image on the Braun tube is decided from whether a uniform primary color raster can be obtained on the whole screen under the condition that any one of the electron beams of red, blue and green is emitted.

However, the apparatus used in measurement is large-sized and very expensive.

By the way, a small amount of color shift (misconvergence) is measured on the large fluorescent screen of a color Braun tube and the conventional measuring apparatus is large-sized. Therefore, the misconvergence is still at present measured with the eye.

For example, if a lattice-like white line is projected on the screen of the color Braun tube, the presence of a color shift will sometimes divide the white line into a red line on one side and green and blue lines on the other side. Thus, the color shift, or the amount of misconvergence, is measured with the human eye.

The prior art needs an expensive and large-sized system and a large space for the automatic measurement of misconvergence. Also, it requires skilled operators, and because of the need for hands, the problem with labor conditions occurs.

Moreover, in the prior art, the maximum output detection adjustment in the color Braun tube is made by adjusting the focus potential to the color Braun tube so as to achieve the most sharp image of lattice stripes or dots while the displayed image on the color Braun tube operated under predetermined conditions is observed with the eye.

In the prior art, however, the adjustment setting greatly depends on the operator's eyes. Moreover, for the color Braun tubes to be used in computers and other information equipment, the maximum output detection adjustment must consider fine lines and points on the screen because fine patterns and letters are displayed thereon, and, therefore a labor sanitary problem is encountered.

SUMMARY OF THE INVENTION

Accordingly, it is an object of this invention to provide a misconvergence measuring apparatus capable of automatic measurement at low cost.

It is another object of this invention to provide a misconvergence measuring apparatus capable of automatic measurement at high speed.

It is still another object of this invention to provide a simple and automatic adjusting circuit for the maximum output detection in the color Braun tube.

The above objects can be achieved by the arrangement comprising a photoelectric transducer of split light-sensitive structure which is provided in front of the phosphor screen of the color Braun tube with a deflection yoke mounted, a deflection source for supplying an output waveform to the deflection yoke so as to move the electron beams of the color Braun tube by a constant unit at a time, and a processor for detecting the position of an excited bright point at which the output of the photoelectric transducer becomes the maximum and controls the deflection source. Since the photoelectric transducer produces a horizontal image of excited bright dots on the color Braun tube, the output of the photoelectric transducer is the maximum when the electron beams reach the phosphor dots which are opposed to the light-sensitive surface. That is, if the electron beams for the respective colors are focused at a point, or converged, the output of the photoelectric transducer becomes the maximum at about the same position, but if the electrons are misconverged, the output of the photoelectric transducer becomes the maximum at different positions where the electron beams arrive, or at positions corresponding to the amount of deviation. Thus, by moving the electron beams by a constant unit at a time, it is possible to accurately and easily find the positions at which the electrons arrive, and to thereby measure the misconvergence.

In addition, the above objects can be achieved by the arrangement comprising a magnifying lens disposed in front of the phosphor screen of the color Braun tube with a deflection yoke mounted, a photoelectric transducer disposed behind the magnifying lens and having three light-sensitive portions of the size which is large enough to cover two different diagonal color dots of the phosphor dots of the color Braun tube which dots are magnified by the magnifying lens, a deflection source for supplying an output waveform to the deflection yoke so as to move the raster by a constant unit at a time, and a processor for detecting the raster position in which the photoelectric transducer produces the maximum output and for controlling the deflection source. When the raster on the color Braun tube is moved with a bright point fixed, and reaches the position in which the electron beams at the bright point coincide with the center axis of each light-sensitive surface of the photoelectric transducer, the output of the photoelectric transducer becomes maximum. Thus, when the photoelectric transducer output corresponding to each of the three primary colors is the maximum, the amount of the misconvergence can be found from the raster position. In other words, if the electron beams are focused at a point, or in convergence, the photoelectric transducer output becomes maximum at about the same position, but if the electron beams are misconverged, the photoelectric transducer output becomes maximum at different positions depending on the amount of deviation.

The above objects can also be achieved by the arrangement comprising an optical lens disposed in front of the phosphor screen of the color Braun tube, a photoelectric transducer disposed behind the optical lens so as to be tilted to the color Braun tube, and a processor for generating signals for causing the phosphor screen to emit light in three longitudinal or lateral lines of red, green and blue separated by a constant distance, and for detecting the light emitting position of excited bright dots at which the output of the photoelectric transducer becomes the maximum, whereby the amount of misconvergence can be determined from the distance between the maximum outputs of the photoelectric transducer. The photoelectric transducer produces the maximum output when the light emission center axis of each color dot of the color Braun tube becomes coincident with the center axis of the photoelectric transducer. Thus, the amount of misconvergence can be measured from the positional relation of the dots at which the photoelectric transducer output for each primary color becomes the maximum. That is, if the electron beams are focused at a point, are in convergence, the transducer output is the maximum at about the same position or at the positions of color dots spaced for each color, but if the electron beams are misconverged, the photoelectric transducer output becomes the maximum at different positions corresponding to the amount of misconvergence where the electron beams reach.

Moreover, the above objects can be achieved by the arrangement comprising image picking-up means for picking up an excited bright pattern on the color Braun tube, a differentiating circuit for differentiating the picked-up image output, a binary digitizing circuit for digitizing the differentiated output into a binary value, Fourier transform means for converting the binary signal into Fourier values, a counter for counting the Fourier transform output, a control circuit which receives the counted signal and produces the next focus potential command each time the counting is completed, and a focus potential generating source for applying a focus potential to the color Braun tube in accordance with the focus potential command, whereby an adjustment is made for the maximum count output as the best focus point, so that the photoelectric transducer produces an output waveform of nearly normal distribution. The excited bright pattern is picked up while the color Braun tube is operative. The picked-up output is differentiated, converted into a binary value and then transformed into a two-dimensional Fourier value, which is counted by the counter. Thus, the control circuit produces the focus potential command and supplies it to the focus potential generating source in order for the Fourier transform output to be the maximum. The focus potential generating source thus generates a focus potential which changes, and supplies it to the color Braun tube. Therefore, the focus potential applied to the color Braun tube so that the counter output becomes the maximum can provide the best focus point.

By the way, the brightness on the phosphor screen of the color Braun tube becomes the maximum when the focus condition is the best at which time the electron beams have the smallest spread. In addition, since each of the electron beams of the color Braun tube is generally spread in the Gaussian distribution and since part of it is sampled by the aperture of shadow mask and then strikes the phosphor, simply finding the maximum output of the transducer will not provide sufficiently high precision. In this respect this invention eliminates the effect of sampling of the electron beams through the apertures of the shadow mask by making measurement after Fourier transform of the picked-up output, thus the precision thus being high.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Figure 1:
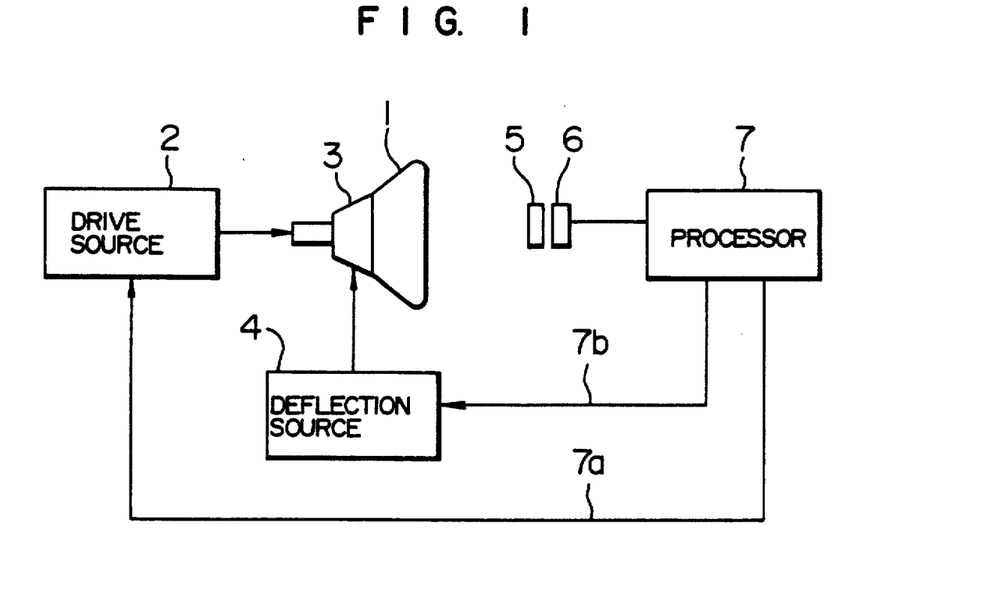
FIG. 1 is a circuit block diagram of a first embodiment of this invention.
Figure 2:
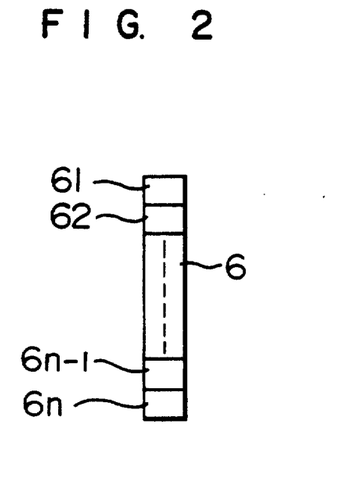
FIG. 2 is a front view of the photoelectric transducer used in FIG. 1.

FIG. 1 is a circuit block diagram of a first embodiment of this invention, and FIG. 2 is a front view of the photoelectric transducer used in FIG. 1.

Referring to FIG. 1, a color Braun tube 1 is supplied with a predetermined voltage from a drive source 2. A deflection yoke 3 is connected with a deflection source 4 by which the electron beams can be moved by a constant unit, for example, 0.1 mm at a time. Also, a cylindrical lens 5 is disposed in the vertical direction in front of the phosphor screen of the color Braun tube 1. Behind the cylindrical lens 5 is disposed a one-dimensional photoelectric transducer 6 of split light-sensitive structure consisting of split light-sensitive cells, $6l$ to $6n$ such as a CCD (Charge Coupled Device), similarly in the vertical direction. The output from this photoelectric transducer 6 is processed by a processor 7 which is formed of a microcomputer. The processor 7 produces control signals 7a and 7b for controlling the drive source 2 and the deflection source 4.

The measurement will be described below.

Figure 3:
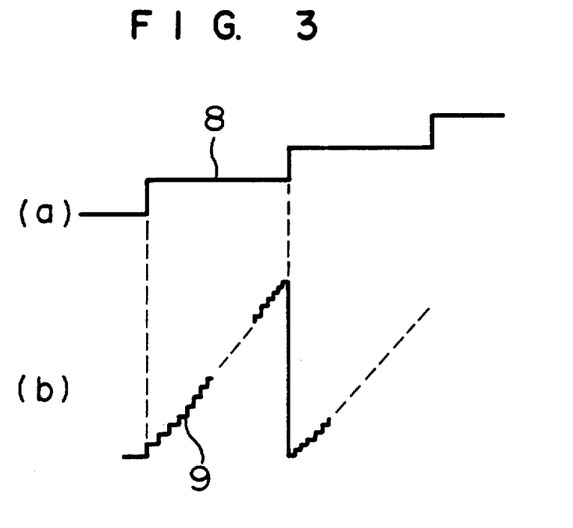
FIG. 3 is waveform diagrams (a), (b) of the vertical deflection output and horizontal deflection output from the deflection source used in FIG. 1, respectively.

FIG. 3 shows the waveforms of the output from the deflection source used in FIG. 1. Shown at (a) is the vertical deflection waveform and at (b) is the horizontal deflection waveform.

Figure 4:
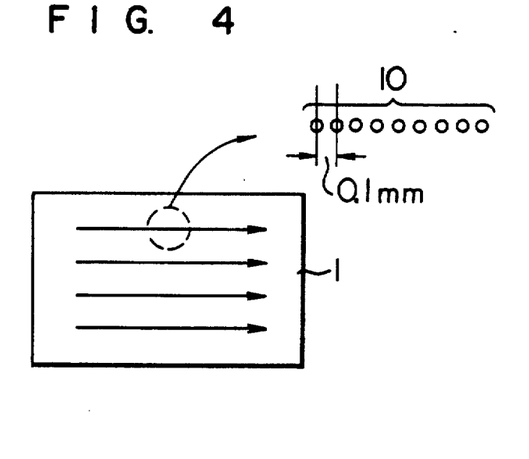
FIG. 4 shows the movement of the bright point for the explanation of the invention.

FIG. 4 is a diagram useful for explaining the invention, showing the movement of the bright point.

In FIG. 1, the control signal 7a formed of an on-off signal for switching colors from the processor 7 controls the drive source 2 to excite one of the red, green and blue phosphors. The control signal 7b from the processor 7 controls the deflection source 4 to produce a vertical deflection current 8 and a horizontal deflection current 9 which has about several tens of thousands of steps per stage of the vertical deflection current 8 as shown in FIG. 3. Under this condition, a bright point 10 is moved just laterally as shown in FIG. 4. When the bright point 10 reaches the end of the horizontal line, it shifts down to the next line and repeats the same movement.

Figure 5:
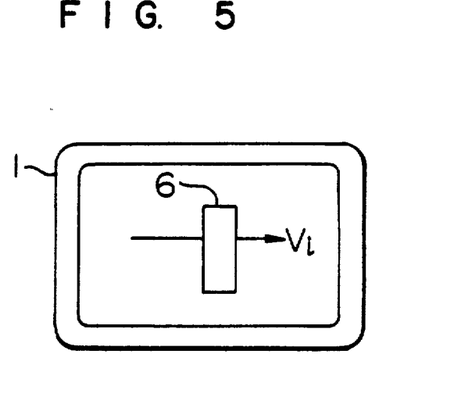
FIG. 5 is a front view of the color Braun tube showing the relation with the photoelectric transducer for the explanation of this invention.
Figure 6A:
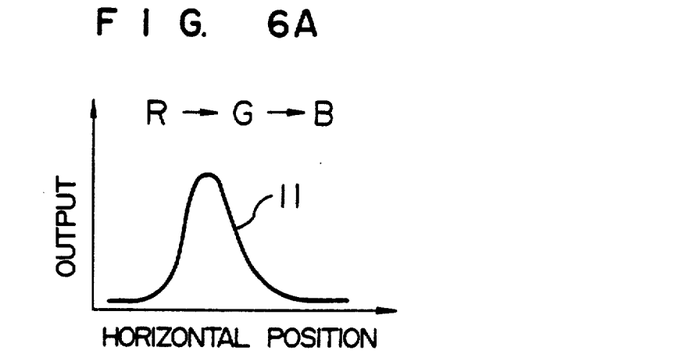
FIGS. 6A and 6B are waveform diagrams of the output of the photoelectric transducer used in FIG. 1.
Figure 6B:
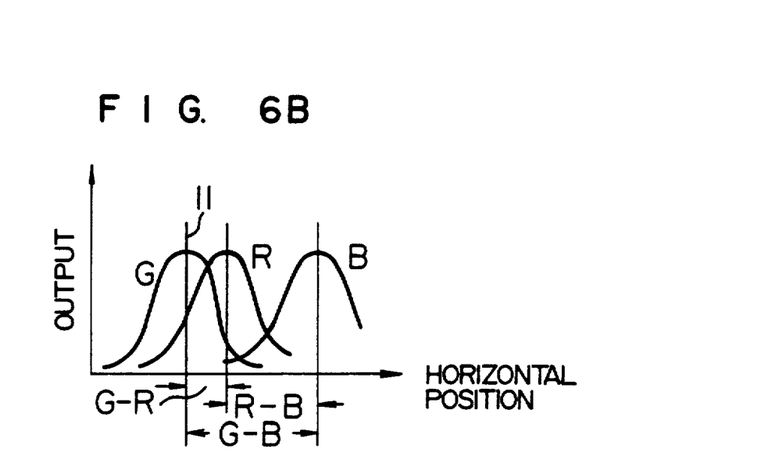

FIG. 5 is a diagram useful for explaining the invention, showing the relation between the color Braun tube and the photoelectric transducer, and FIG. 6A and FIG. 6B show the waveforms of the output from the photoelectric transducer. If this operation is observed by viewing the screen shown in FIG. 5, the output 11 from the photoelectric transducer 6 at a vertical position Vi is shown in FIG. 6A. Thus, if the photoelectric transducer output 11 is measured for each of the three primary colors of red R, green G and blue B in turn, the amount of misconvergence in the lateral direction can be determined from the difference between the horizontal deflection positions of the maximum outputs for the primary colors.

In other words, in the normal case in which no misconvergence is present, the output waveforms 11 for the three colors R, G, B are, correctly overlapped on each other as shown in FIG. 6A, but in the presence of misconvergence the output waveforms 11 for the three colors R, G, B are not coincident as shown in FIG. 6B.

The measurement of the vertical misconvergence will be described below.

Figure 7:
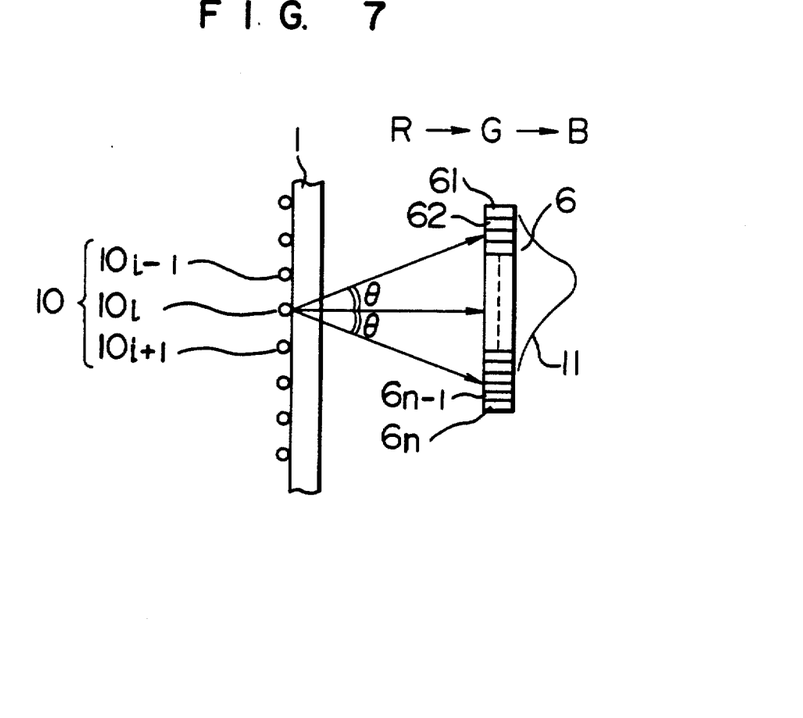
FIG. 7 is a longitudinal cross-section of the arrangement of the bright point and the photoelectric transducer for the explanation of this invention.

FIG. 7 is a longitudinal cross-section of the photoelectric transducer and color Braun tube, showing the relation between the bright point and the transducer for the explanation of the invention.

If, now, the bright point 10 is considered at vertical positions as shown in FIG. 7, the n light-sensitive cells $6l$ to $6n$ of the photoelectric transducer 6 produce the maximum output relative to the i-th bright point $10i$ just opposing the corresponding cell. As the bright point is shifted vertically, the light is incident to the transducer 6 at angle $\theta$, or the transducer output is decreased in accordance with $\cos \theta$. Thus, since the bright position where the output 11 of the photoelectric transducer 6 is the maximum can be easily determined by the position of the cells $6l$ to $6n$ of the transducer 6, the amount of the vertical misconvergence can be found for red R, green G and blue B in turn as that of the horizontal misconvergence.

Since the misconvergence can be measured from the position of the cell $6l$ to $6n$ at which the output 11 of the transducer 6 is the maximum and the difference between steps of the staircase waveform, only reducing the step difference of the staircase waveform or the size of the cells $6l$ to $6n$ of the photoelectric transducer up to the readable resolution will make the misconvergence measurement accurate. This embodiment is simple in its construction and thus inexpensive.

The cylindrical lens 5 provided in the first embodiment of this invention as shown in FIG. 1 serves to collect light in the horizontal direction, so as to cover a horizontal range, thus improving the measurement precision.

Figure 8:
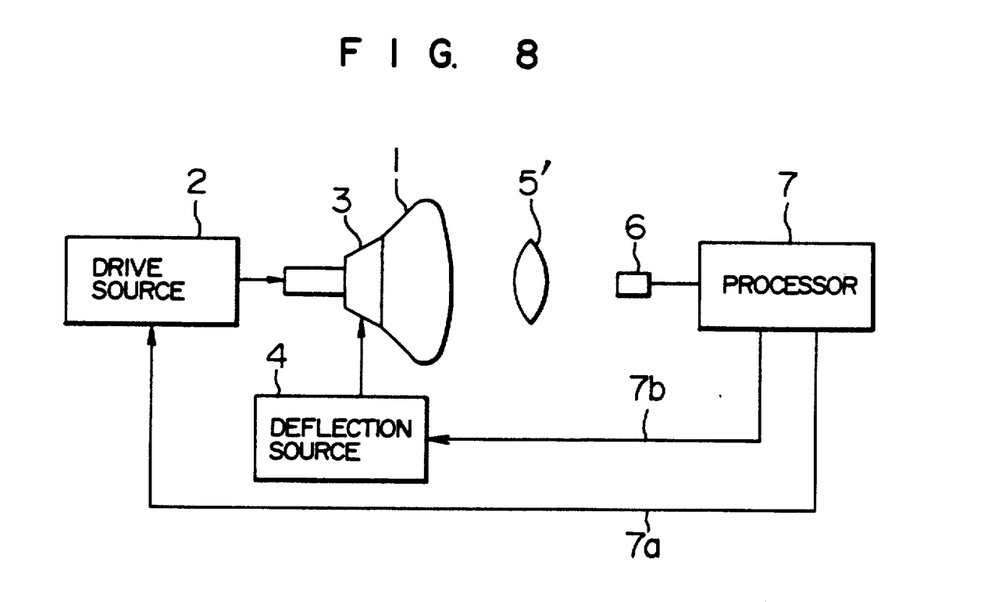
FIG. 8 is a circuit block diagram of a second embodiment of this invention.
Figure 9:
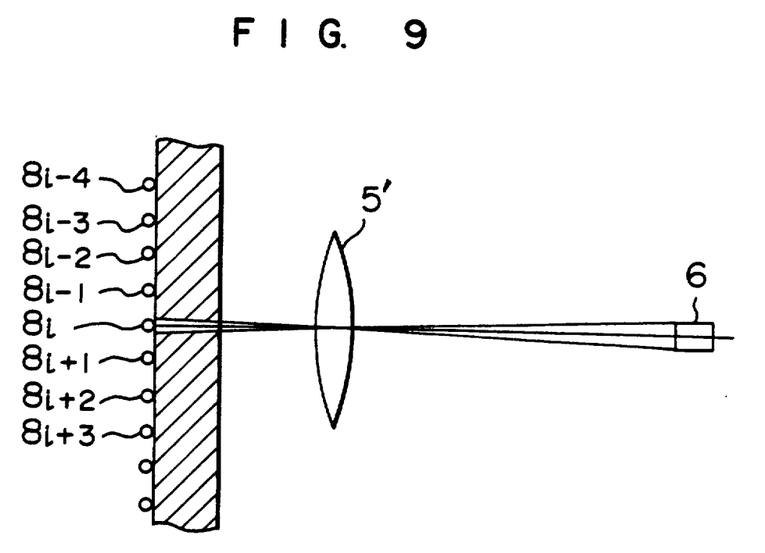
FIG. 9 is a relation view of the bright point, and the magnifying lens and photoelectric transducer shown in FIG. 8.

FIG. 8 is a circuit block diagram of a second embodiment of this invention, and FIG. 9 is a relation view of the bright point, and the magnifying lens and photoelectric transducer shown in FIG. 8.

In FIGS. 8 and 9, like elements corresponding to those in FIG. 1 are identified by the same reference numerals.

In FIG. 8, the deflection yoke 3 is connected with the deflection source 4 which is able to move the normal raster unit by unit. A magnifying lens 5' constituted by a convex lens is disposed in front of the screen of the color Braun tube 1, and the photoelectric transducer 6 of having spot sensors is disposed behind the magnifying lens 5'. The output of the photoelectric transducer 6 is processed by the processor 7 in the same way as in FIG. 1. The processor 7 produces the control signals 7a and 7b for controlling the drive source 2 and the deflection yoke 4.

The magnifying lens 5' and the photoelectric transducer 6 are disposed so that the optical axis of the lens 5' and photoelectric transducer 6 are coincident with one bright point $8i$ of the color Braun tube 1 as shown in FIG. 9.

Figure 10:
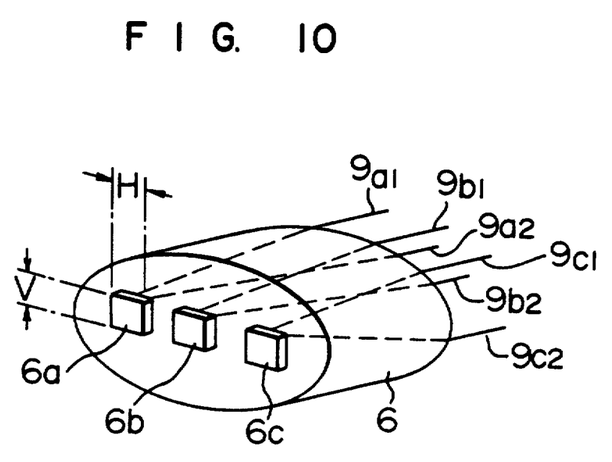
FIG. 10 is a perspective view of the photoelectric transducer used in FIG. 8.
Figure 11:
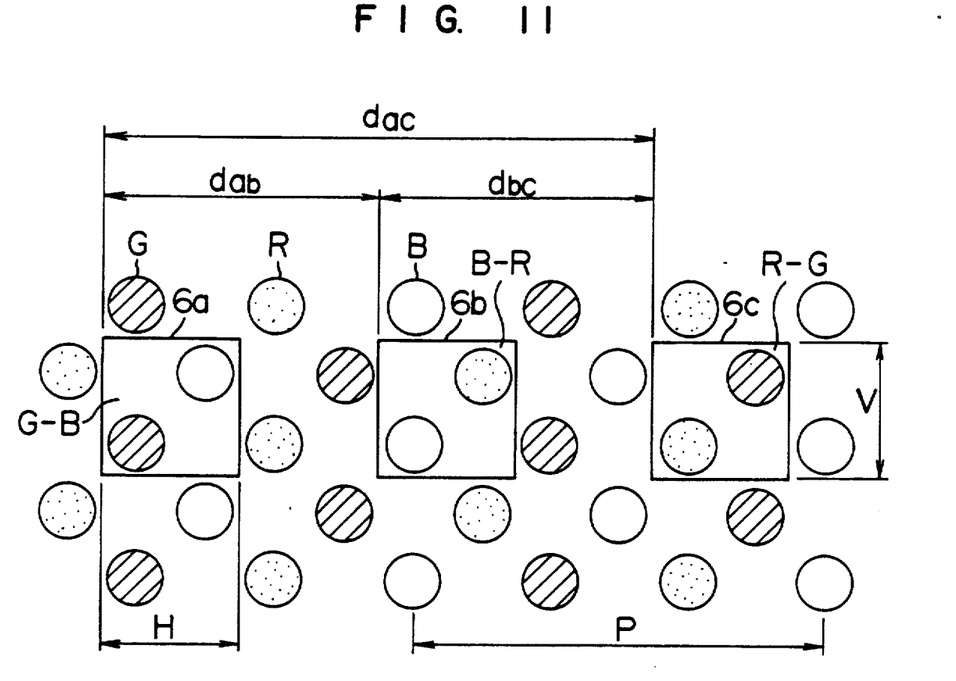
FIG. 11 shows the relation between the phosphor dots and the light sensitive portion of the photoelectric transducer in FIG. 10.

FIG. 10 is a perspective view of the photoelectric transducer used in FIG. 8, and FIG. 11 shows the relation between the phosphor dots and the light-sensitive portions of the transducer in FIG. 10.

The photoelectric transducer 6 has as shown in FIG. 10 three light-sensitive portions 6a, 6b and 6c with separate pairs of leads 9a1, 9a2, 9b1, 9b2 and 9c1, 9c2.

The light-sensitive portions 6a, 6b, 6c each have a height V and a width H to cover only two diagonal color phosphor dots of each three color phosphor dots (red R, green G and blue B) as shown in FIG. 11. The spacing a between the light-sensitive portions 6a, 6b, 6c is expressed as $$d = \frac{P}{6} \cdot n \tag{1}$$

where P is the lateral pitch of the phosphor dots, or the distance between the same color dots and n is a magnification factor.

In FIG. 11, $d_{ab}$ is the distance between the light-sensitive portions 6a and 6b, $d_{bc}$ is the distance between the light-sensitive portions 6b and 6c and $d_{ac}$ is the distance between the light-sensitive portions 6a and 6c.

In FIG. 11, n is selected to be 4 and 8. If in this way the size, V, H and distance d of the light sensitive portions 6a, 6b, 6c are fixed relative to the phosphor dot arrangement, each of the light sensitive portions 6a, 6b, 6c corresponds to two different color dots of the three primary color phosphor dots R, G, B.

The measurement of misconvergence will be described below.

Figure 12:
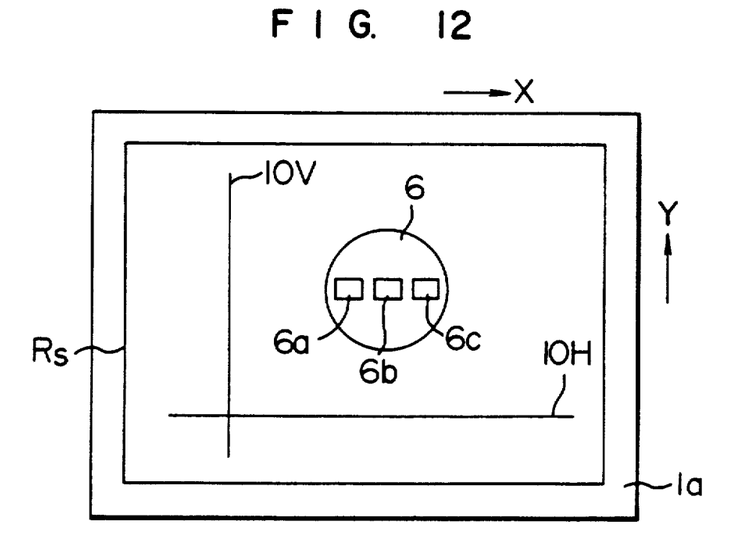
FIG. 12 shows the relation between the phosphor screen of the color Braun tube and the photoelectric transducer.
Figure 13:
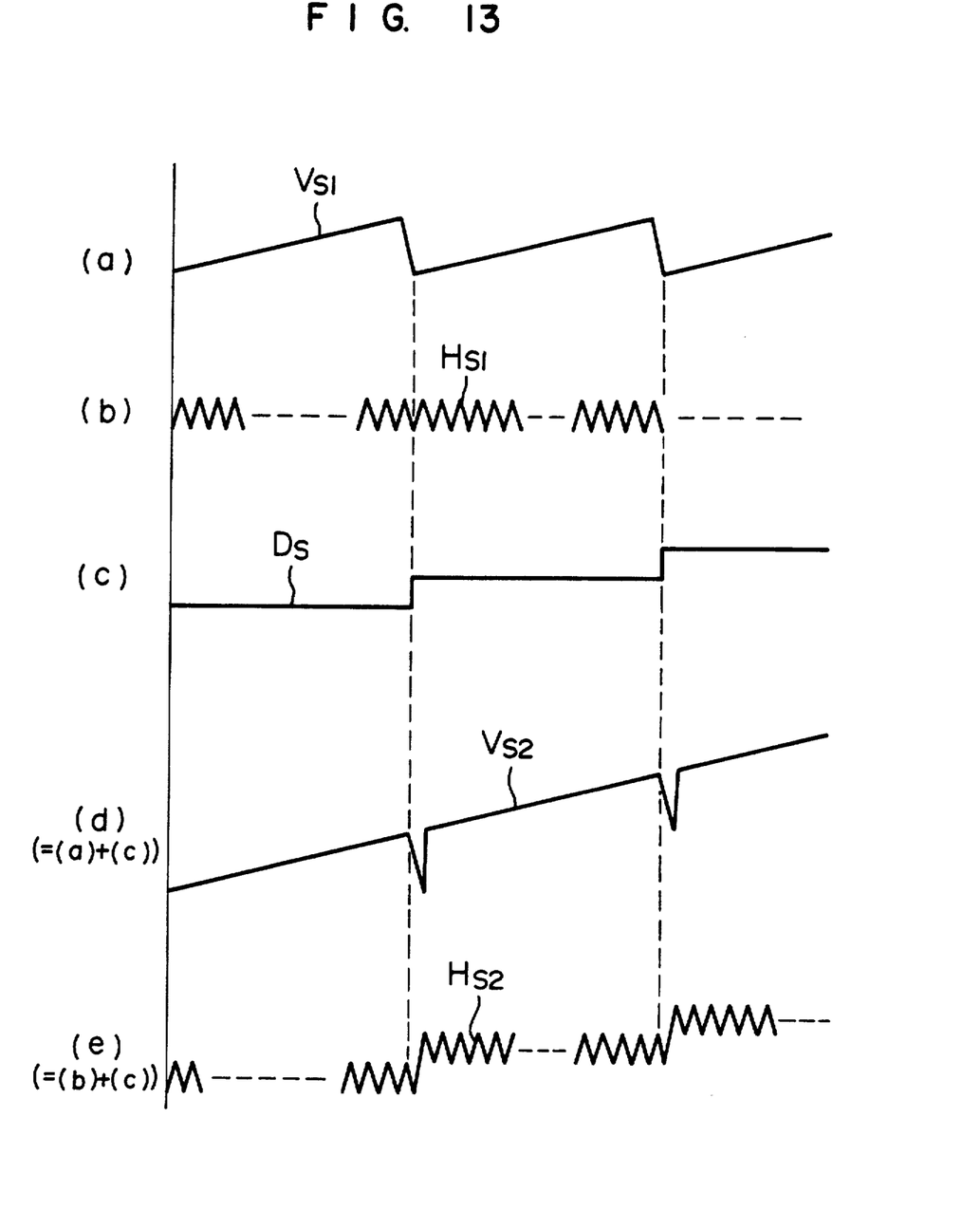
FIG. 13 is a waveform diagram of the output from the deflection source of FIG. 8 wherein (a) shows the vertical deflection waveform, (b) the horizontal deflection waveform, (c) the DC current waveform for use in movement of raster, (d) the (c)-composite-on-(a)} waveform and (e) (c)-composite-on-(b) waveform.
Figure 14:
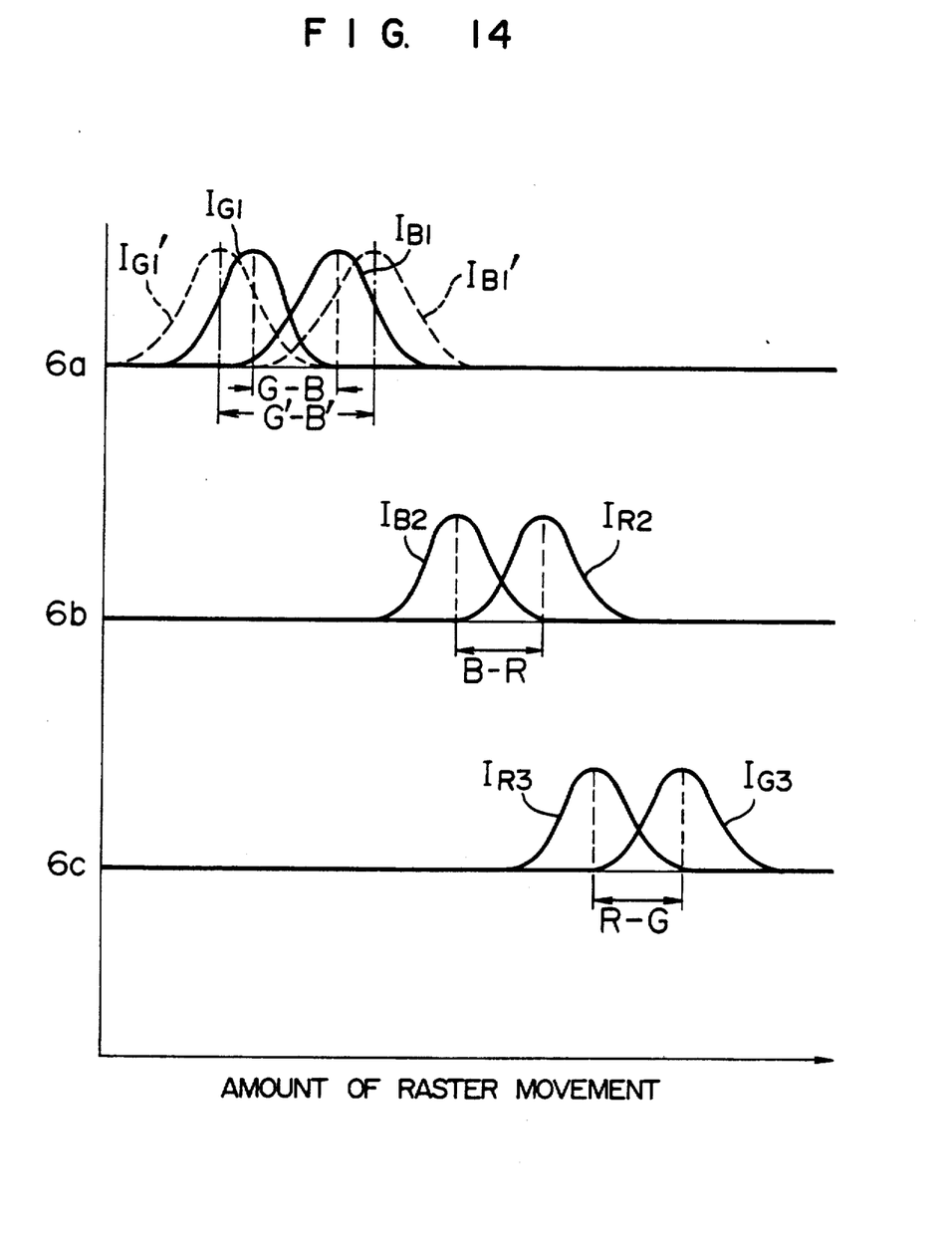
FIG. 14 shows the relation between the output of the photoelectric transducer of FIG. 8 and the amount of raster movement.

FIG. 12 shows the relation between the phosphor screen 1a of the color Braun tube and the photoelectric transducer, FIG. 13 shows output waveforms from the deflection source of FIG. 8, and FIG. 14 shows the relation between the output of the photoelectric transducer of FIG. 8 and the amount of movement of the raster.

In FIG. 8, the control signal 7a from the processor 7 controls the drive source 2 to excite a vertical line 10 V of one of the three colors red, green and blue on the phosphor screen 1a of the color Braun tube 1 as shown in FIG. 12 and similarly the same operation is made in turn for the remaining two colors. The deflection yoke 3 is supplied with a vertical sawtooth wave current $V_{S1}$ and a horizontal sawtooth wave current $H_{S1}$ for raster scan as shown in FIGS. 13(a), (b). Thus, the DC current $D_S$ of staircase synchronized with the vertical sawtooth wave current $V_{S1}$ as shown in FIG. 13(c) is composite upon the horizontal sawtooth wave current $H_{S1}$ shown in FIG. 13(b) to produce the horizontal deflection current $H_{S2}$ shown in FIG. 13(e), which is then supplied together with the vertical sawtooth wave current $V_{S1}$ from the processor 7 via the control line 7b to the deflection yoke 3 to thereby shift the raster including the vertical line 10 V in FIG. 12 in the X-direction and allow it to pass by the transducer 6. At this time, the output of the light sensitive portion 6a, 6b, 6c of the photoelectric transducer 6 is supplied to the processor 7 and stored therein. For the other two colors, the same measurement is made as described above.

Thus, as shown in FIG. 14, large transducer outputs can be produced when two color phosphor dots of the three color dots are excited in the combinations of light sensitive portion 6a, 6b, 6c and the phosphor dots as the raster is moved. That is, the light sensitive portion 6a produces green output $I_{G1}$ and blue output $I_{B1}$ in the combination shown in FIG. 11. Similarly, the light sensitive portion 6b produces output of $I_{B2}$, $I_{R2}$ and the light sensitive portion 6c produces output of $I_{R3}$, $I_{G3}$ At this time, the maximum value or centroid position is found from the output data of the light sensitive portions 6a, 6b, 6c, and the DC current at this position is determined as the difference between two colors, G-B (deviation between G and B), B-R (deviation between B and R), and R-G (deviation between R and G). If there is no misconvergence, this difference is 1/6 the phosphor pitch P which is determined by the positions of the light sensitive portions 6a, 6b, 6c, or by the phosphor dot arrangement. If there is any misconvergence, as shown in FIG. 14 by broken lines $I'_{G1}$, $I'_{B1}$ at 6a the difference G'-B' increases in accordance with the deviation. The amount of misconvergence can easily be determined from the amount of movement of raster per stage of DC current $D_S$. The same is true for the light sensitive portions 6b, 6c.

Thus, the deviation of misconvergence in the X (lateral) direction is found. The deviation of misconvergence in the Y (vertical) direction is found by exciting the lateral line 10 H, and exchanging the current flowing from the processor 7 via control line 7b to deflection yoke 3 with the above case. In other words, the vertical deflection current $V_{S2}$ is flowed as shown in FIG. 13(d), and the horizontal deflection current, or horizontal sawtooth wave current $H_{S1}$ is flowed as shown in FIG. 13(d), so that the raster $R_S$ is moved in the Y-direction. Then, according to the same procedure as above, the vertical deviation of misconvergence can be determined.

Thus, since the amount of misconvergence can be found from the maximum outputs of the photoelectric transducer 6 or the step difference of DC current at the centroid point, the amount of the misconvergence can be measured with high precision under the condition that only the step difference of the DC current is reduced to necessary readable resolution.

Figure 15:
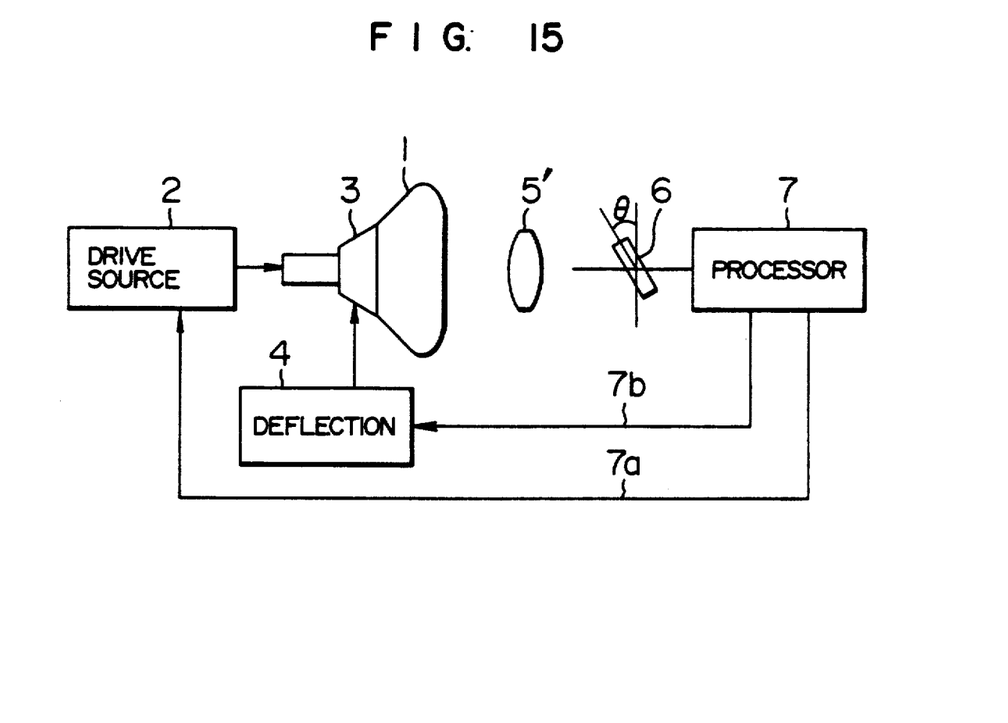
FIG. 15 is a circuit block diagram of a third embodiment of this invention.
Figure 16:
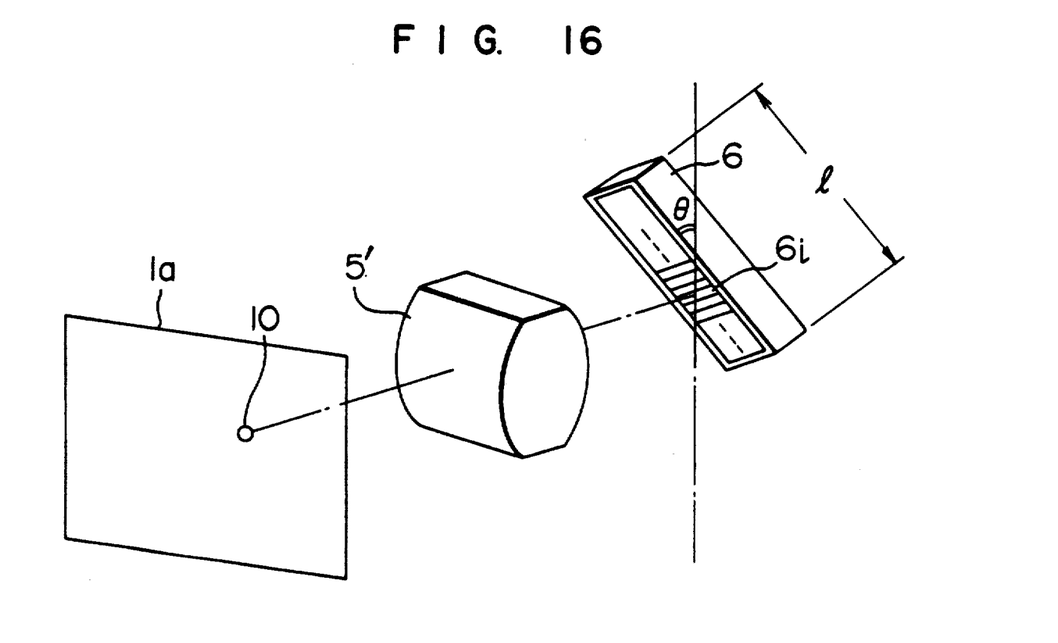
FIG. 16 shows the relation among the bright point, optical lens and the photoelectric transducer shown in FIG. 15.

FIG. 15 is a circuit block diagram of a third embodiment of this invention, and FIG. 16 shows the relation among the bright point, optical lens and photoelectric transducer in FIG. 15.

Referring to FIG. 15, the deflection yoke 3 is connected with the deflection source 4 for scanning the electron beams. The magnifying lens 5' is disposed in front of the phosphor screen 1a of the color Braun tube 1, and a one-dimensional photoelectric transducer 6 is disposed behind the magnifying lens 5'. The one-dimensional photoelectric transducer 6 is, as shown in FIG. 16, tilted to the phosphor screen 1a of the color Braun tube 1. The light from the bright point 10 on the phosphor screen 1a is passed through the optical lens 5' to the element 6i of the light-sensitive portions of the one-dimensional photoelectric transducer element 6. The output of the one-dimensional photoelectric transducer 6 is processed by the processor 7. The processor 7 produces control signals 7a, 7b for controlling the drive source 2 and deflection source 4.

Figure 17A:
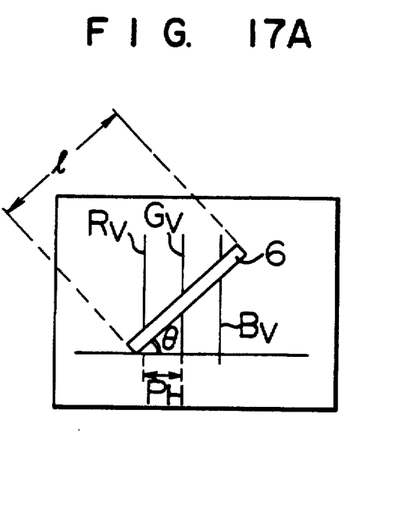
FIGS. 17A and 17B show the relation between the photoelectric transducer and the bright lines of red, green and blue.
Figure 17B:
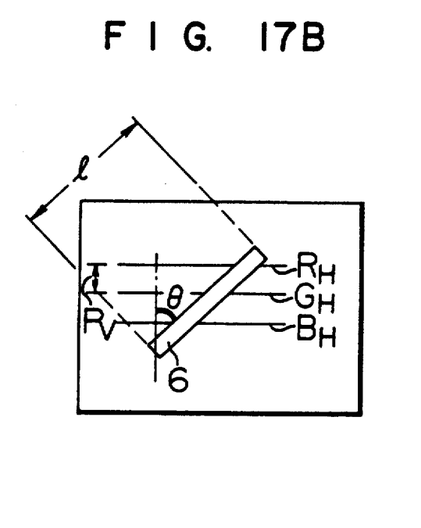
Figure 18:
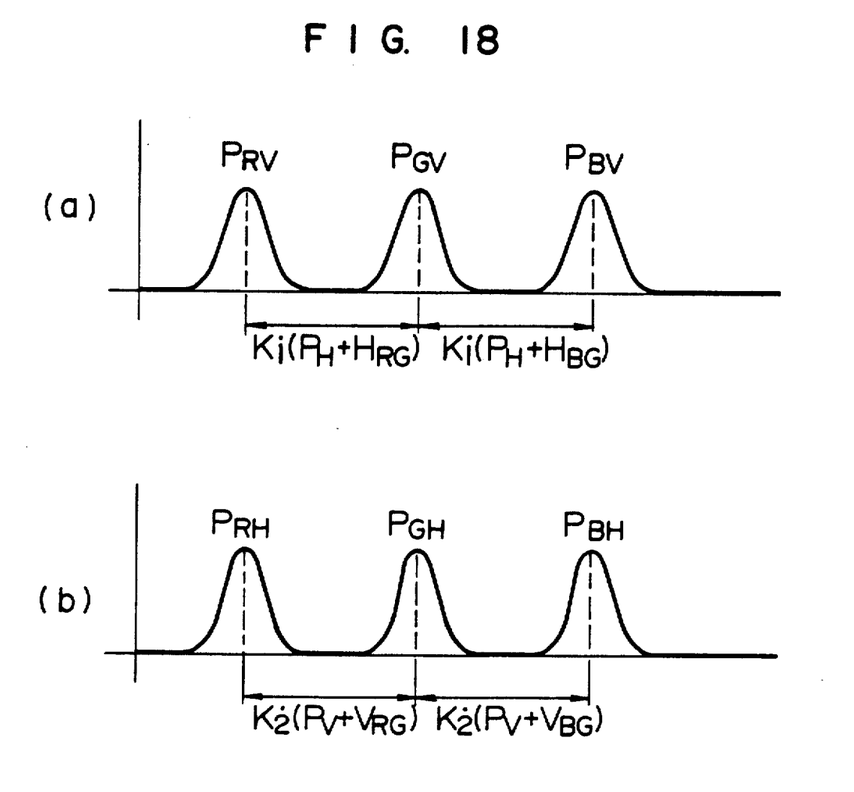
FIGS. 18 shows outputs (a) and (b) of the photoelectric transducer used in FIG. 15.

FIG. 17A and FIG. 17B show the relation between the transducer and the red, green and blue bright lines, and FIG. 18 shows outputs (a) and (b) from the transducer used in FIG. 15.

The control signal 7a, as shown in FIG. 17A, FIG. 17B, controls the drive source 2 to excite three color vertical lines of red, green and blue $R_V$, $G_V$, $B_V$ or lateral lines $R_H$, $G_H$, $B_H$ spaced laterally $P_H$ or vertically $P_V$ (for example, about 5 mm).

In FIG. 17A and FIG. 17B, at $\theta = 45°$, the length l of the transducer 6 is expressed as $$l \geq 2\sqrt{2}\, P_H \tag{2}$$

$$l \geq 2\sqrt{2}\, P_V \tag{3}$$

The measurement will be described below. First, as to the lateral misconvergence, the drive source 2 is controlled by the control signal 7a from the processor 7 to excite the red, green and blue vertical lines $R_V$, $G_V$, $B_V$ shifted by lateral distance $P_H$, so that the light therefrom is incident to the light-sensitive surface of the tilted one-dimensional transducer 6 as shown in FIG. 17A. At this time, the output from the transducer 6 is shown in (a) of FIG. 18. That is, if the coefficient of the optical lens 5' to the lateral distance $P_H$ of bright patterns is represented by K1 (K1=2 to 3), the vertical output $P_{RV}$, $P_{GV}$, $P_{BV}$ associated with the bright patterns are produced at positions spaced by K1·$P_H$. If the misconvergence in the lateral direction is $H_{RG}$ for red and green and $H_{BG}$ for blue and green, the actual distances between transducer outputs are K1 ($P_H + H_{RG}$) and K1 ($P_H + H_{BG}$). Thus, the amount of misconvergence can be determined by simple calculation in the processor 7.

The vertical misconvergence will be mentioned below. If the red, green and blue lateral lines $R_H$, $G_H$, $B_H$ spaced by $P_V$ are excited as shown in FIG. 17B, the transducer output shown in (b) of FIG. 18 is produced. In (b) of FIG. 18, $P_{RH}$, $P_{GH}$, $P_{BH}$ indicate lateral brightness outputs. If the coefficient of the optical lens 5' to the vertical distance $P_V$ between bright patterns is represented by K2, and if the vertical misconvergence for red and green is represented b $V_{RG}$ and for blue and green by $V_{BG}$, then the distances between the transducer outputs are K2 ($P_V + V_{RG}$) and K2 ($P_V + V_{BG}$) as in the lateral misconvergence.

The lateral distance $P_H$ and vertical distance $P_V$ of the bright patterns and the length l of the one-dimensional photoelectric transducer 6 can be determined by the following expressions (4) to (6).

$$P_H \geq 2(\Delta C_V + \Delta\omega)/\cos\theta \quad (4)$$

$$P_V \geq 2(\Delta C_V + \Delta\omega)/\cos\theta \quad (5)$$

$$l \geq 3(\Delta C_V + \Delta\omega)/\cos\theta \quad (6)$$

where $\Delta C_V$ is the maximum amount of misconvergence, and $\Delta\omega$ is the line width of the bright patterns.

Since the amount of misconvergence can be determined from the distances between the outputs of the one-dimensional photoelectric transducer 6, only proper selection of the element size of the one-dimensional photoelectric transducer 6 and optical lens 5' for the necessary resolution will make accurate measurement. Moreover, since the one-dimensional photoelectric transducer 6 is tilted, the deviation of misconvergence is magnified by, for example, $\sqrt{2}$ if the angle is 45°, thus improving the precision.

Figure 19:
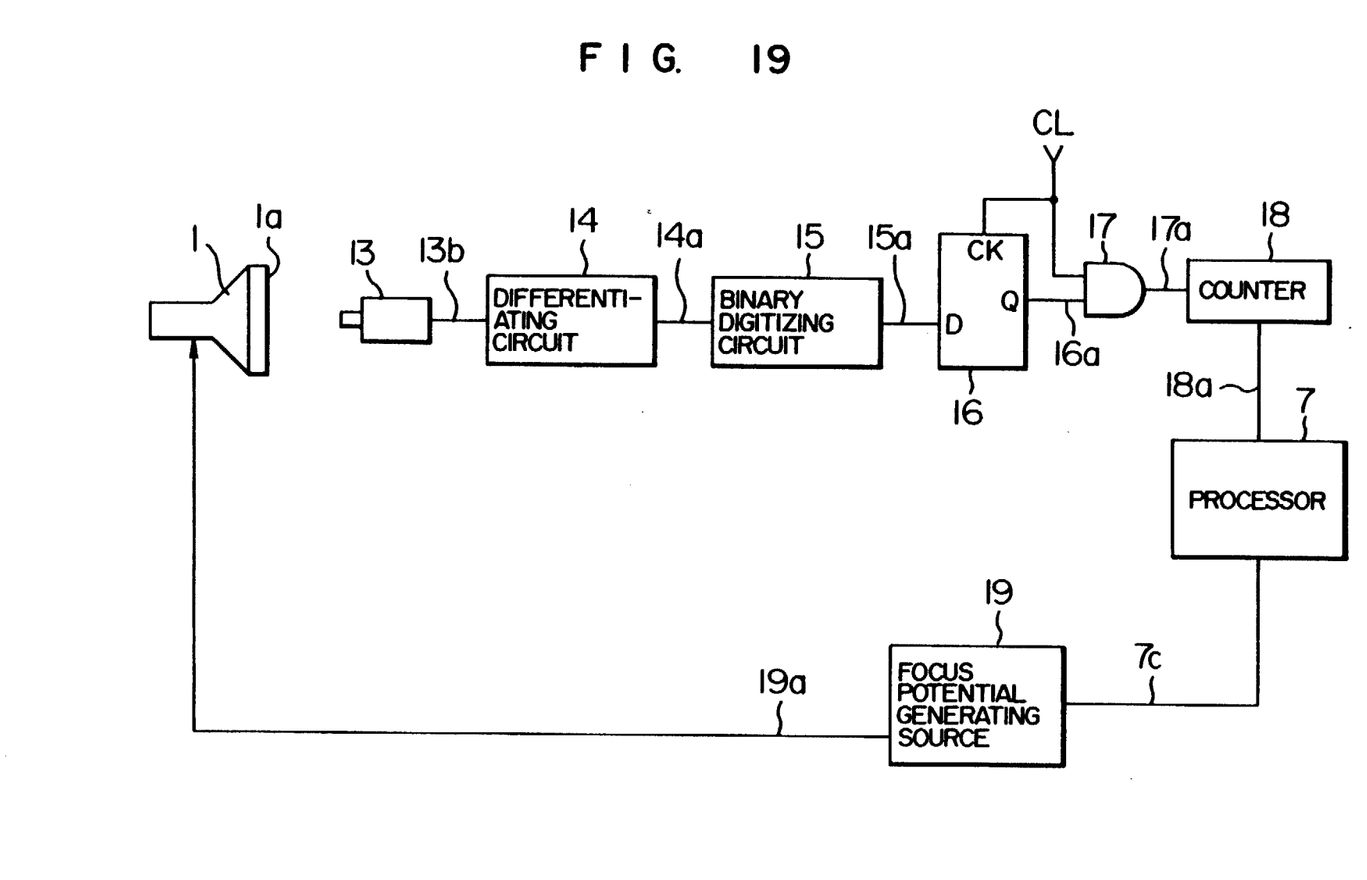
FIG. 19 is a circuit block diagram of the circuit arrangement for detecting the maximum output of the color Braun tube used in this invention.
Figure 20:
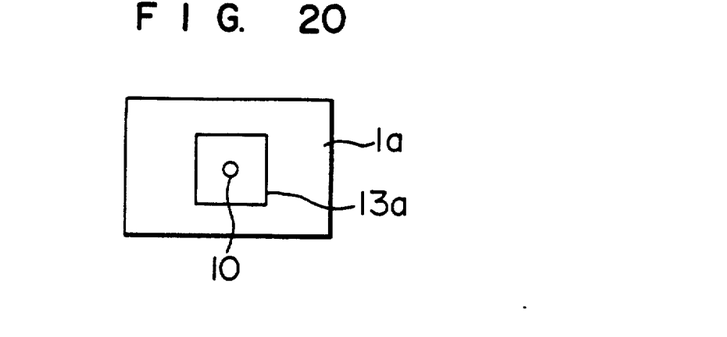
FIG. 20 is a front view of the screen of the color Braun tube used in FIG. 19.

FIG. 19 is a circuit block diagram of the circuit arrangement for detecting the maximum output of the color Braun tube used in this invention, by which the amount of misconvergence can be measured accurately, and FIG. 20 is a front view of the screen of the color Braun tube used in FIG. 19.

As illustrated in FIG. 19 and FIG. 20, the small bright point 10 is excited on the screen 1a of the color Braun tube 1. The pattern of the bright point 10 is picked up by a camera 13. The range 13a which the camera can pick up is wide enough relative to the bright point 10.

Figure 21:
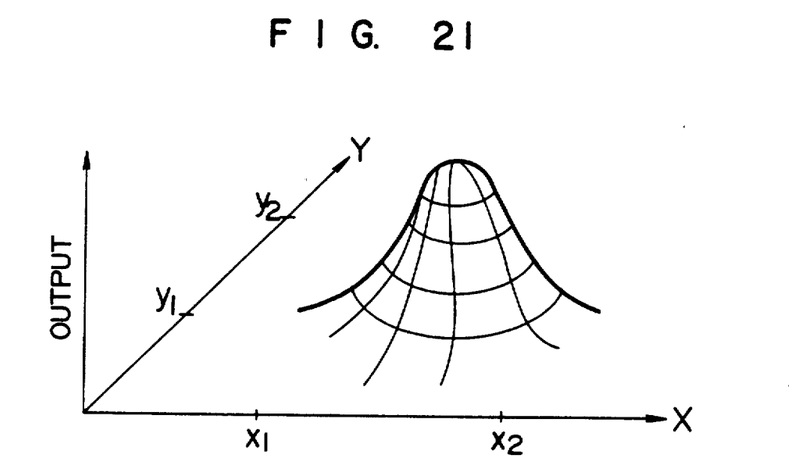
FIGS. 21 and 22 are diagrams useful for explaining the bright point on the color Braun tube used in this invention.
Figure 22:
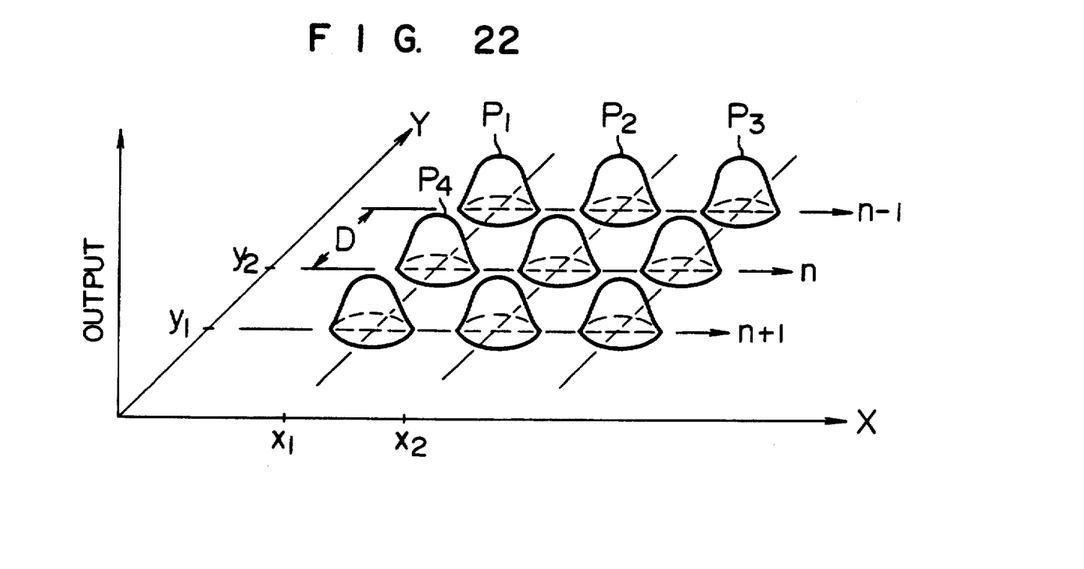

FIG. 21 and FIG. 22 are diagrams useful for explaining the bright points on the color Braun tube used in this invention.

The actual light distribution from the bright point 10 of the color Braun, tube 1 is as shown in FIG. 21, its skirt spreading with the change of the focus potential. In this case, the spread in the x- and y-direction is normally not uniform.

According to this invention, the output waveforms from the photoelectric transducer 6 are made to approach the normal distribution, as shown in FIGS. 6A, 6B, 14 and 18, by proper change of focus potential.

The light output distribution is the collection of the passing light rays P1 to Pn passing through an aperture of the shadow mask as shown in FIG. 22. When an arbitrary scanning line n−1 is viewed, the light rays P1, P2, P3 are emitted in this order. If the focus potential is proper, the high frequency components of the passing light rays are at a maximum. That is, the differential output of an image is integrated in a two-dimensional region, and the best focus point is so determined that the following output F of the following equation (7) becomes a maximum.

$$F = \int_{y1}^{y2} \int_{x1}^{x2} \left[ V\left(\frac{\partial f}{\partial x} - t_1\right) + u\left(\frac{\partial f}{\partial x} + t_2\right) \right] dt dy \quad (7)$$

where
  f : the camera output
  v : the step function

Moreover, if the phosphor dots of the color Braun tube 1 and the bright point for scan are sufficiently small as compared with the distance D of scanning lines, the result is that the image is sampled in Y-direction by delta function $\delta$, and thus the following equation (8) is satisfied.

$$g(x,y) = f(x,y) \sum_{n=-\infty}^{\infty} \delta(y - nD) \quad (8)$$

where
  f(x,y) : the original image
  g(x,y) : output image
  n : 0, 1, 2...

Since this is the multiplying operation of coordinate region, the Fourier transform G(u,v) is expressed by the equation (9), $$G(u,v) = F(u,v) * S(v) \quad (9)$$

The spectrum S(v) is the spectrum of the delta function of distance D, or the pulse of frequency $2\pi/D$. Since the spectrum of the G(u,v) has a width, it is satisfactory to sample at an interval which meets the equation (10) for the frequency band width $B_\omega$ of the camera 13.

$$B_\omega < \frac{\pi}{D} \quad (10)$$

The processing for the equation (9) is performed by the circuit shown in FIG. 19. That is, the video output 13b of the camera 13 is differentiated by the differentiating circuit 14, or $\partial x^{\partial f}$ is made on the equation (7). The differentiated output 14a is converted into the digital signal 15a of 1 or 0 by the binary digitizing circuit 15. The digital signal 15a is supplied to the input of the flip-flop 16, and the flip-flop output 16a is supplied to one input of the AND gate 17. The AND gate 17 is also supplied with the sample signal CL which meets the equation (10) at the other input to produce the sampling output 17a. Thus, $$\left[ V\left(\frac{\partial f}{\partial x} - t_1\right) + U\left(\frac{\partial f}{\partial x} + t_2\right) \right]$$

of the equation (7) can be calculated. This sampling output 17a is counted by the counter 18, which thus produces the output F of the equation (7). The counted output 18a or output F is supplied to the control circuit 7. The control circuit 7 supplies the next focus potential command 7c to the focus potential source 19 each time one counting operation is completed. The focus potential source supplies the focus potential 19a to the color Braun tube 1.

This operation is repeated until the counted output 18a of the counter 18 becomes the maximum. Thus, the best focus point is determined and the corresponding focus potential command 7c is supplied to the focus potential source 19, which then supplies the best focus potential 19a to the color Braun tube 1, thus completing the adjustment for detecting the maximum output of the color Braun tube to thereby enable the misconvergence to be measured with high precision.

While in the above embodiment a camera is used as the means for picking up the image on the color Braun tube 1, a zero-dimensional transducer such as a photodiode may be used, in which case the same effect can be achieved even if the phosphor screen 1a of the color Braun tube 1 is excited over more than the area covering the photoelectric transducer 6. Also, in this case, the signal source for generating a signal by which a very small bright point is excited on the screen, and video circuits can be omitted.

The present invention has the following effects.

1. The amount of misconvergence can be accurately and automatically found by an inexpensive apparatus.

2. The measurement of misconvergence does not need the switching of colors and thus can be made at high speed with no need to use of color photoelectric transducers.

3. Because the vertical deflection output waveform from the deflection source is of a staircase, it is easy to detect the position of the maximum output.

4. Only by reducing the size of the split cells of the photoelectric transducer, it is possible to easily detect the amount of misconvergence with higher accuracy.

5. The adjustment of the maximum output detection circuit for the color Braun tube can be automatically carried out with a simple circuit. The precision of the adjustment can be increased to the extent that, for example, the variation of the focus potential of about 7 KV can be limited to 10 V or below.

We claim:

1. A misconvergence measuring apparatus comprising:
    a photoelectric transducer of split light-sensitive structure disposed in front of a phosphor screen of a color Braun tube with a deflection yoke mounted;
    a deflection source for supplying to said deflection yoke an output waveform which deflects the electron beams of said color Braun tube by a constant unit at a time; and
    a processor for detecting the position of a bright point on said phosphor screen where the output of said photoelectric transducer becomes the maximum, and for controlling said deflection source.

2. A misconvergence measuring apparatus comprising:
    a photoelectric transducer of split light-sensitive structure disposed in a vertical direction in front of a phosphor screen of a color Braun tube with a deflection yoke mounted;
    a lens disposed opposite to said photoelectric transducer and between said color Braun tube and said photoelectric transducer;
    a deflection source for supplying to said deflection yoke an output waveform which deflects the electron beams of said color Braun tube by a constant unit at a time; and
    a processor for detecting the position of a bright point on said phosphor screen where the output of said photoelectric transducer becomes the maximum.

3. A misconvergence measuring apparatus according to claim 1, wherein said output waveform from said deflection source is a vertical deflection waveform having the form of a staircase.

4. A misconvergence measuring apparatus according to claim 2, wherein said output waveform from said deflection source is a vertical deflection waveform having the form of a staircase.

5. A misconvergence measuring apparatus according to claim 2, wherein said lens is a cylindrical lens.

6. a misconvergence measuring apparatus according to claim 2, wherein said photoelectric transducer is a one-dimensional photoelectric transducer.

7. A misconvergence measuring apparatus comprising:
    a magnifying lens disposed in front of a phosphor screen of a color Braun tube with a deflection yoke mounted;
    a photoelectric transducer disposed behind said magnifying lens and which has at least three light-sensitive portions of the size capable of covering two diagonal color dots of the phosphor dots of said color Braun tube which dots are magnified by said magnifying lens;
    a deflection source for supplying to said deflection yoke an output waveform which deflects a raster by a constant unit at a time; and
    a processor for detecting the position of said raster where the output of said photoelectric transducer becomes the maximum, and for controlling said deflection source.

8. A misconvergence measuring apparatus according to claim 7, wherein said photoelectric transducer is a spot sensor.

9. A mixconvergence measuring apparatus according to claim 7, wherein said output waveform from said deflection source is a vertical deflection waveform having the form of a staircase.

10. A misconvergence measuring apparatus according to claim 7, wherein the distanced between said light-sensitive portions of said photoelectric transducer can be expressed as $$d = \frac{P}{6} \cdot n$$

where P is the lateral pitch of the phosphor dots, and n is the number of multiple.

11. A misconvergence measuring apparatus comprising:
    an optical lens disposed in front of a phosphor screen of a color Braun tube;
    a photoelectric transducer element disposed behind said optical lens and to be tilted at an angle $\theta$ to said color Braun tube; and
    a processor for producing a signal which allows three-color vertical lines or lateral lines of red, green and blue to be excited with a constant spacing on said phosphor screen, and for detecting the position of a bright point on the phosphor screen where the output of said photoelectric transducer becomes the maximum;

whereby the amount of misconvergence is found from the distance between the maximum outputs of said photoelectric transducer.

12. A misconvergence measuring apparatus according to claim 11, wherein the length l of said photoelectric transducer at $\theta = 45°$ is determined from the following expressions, $$l \geq 2\sqrt{2}\, P_V$$

$$l \geq 2\sqrt{2}\, P_H$$

13. A misconvergence measuring apparatus according to claim 11, wherein the length l, tilt angle $\theta$, lateral distance $P_H$ and longitudinal distance $P_V$ of said photoelectric transducer are determined from the following expressions, $$l \geq 3(\Delta C_V + \Delta\omega)/\cos\theta$$

$$P_H \geq 2(\Delta C_V + \Delta\omega)/\cos\theta$$

$$P_V \geq 2(\Delta C_V + \Delta\omega)/\cos\theta$$

where $\Delta C_V$ is the maximum amount of misconvergence, and $\Delta\omega$ is the line width of the excited bright pattern.

14. A maximum output detection circuit for misconvergence measuring apparatus comprising:

camera means for picking up an excited bright pattern on a color Braun tube;

a differentiating circuit for differentiating the camera output;

a binary digitizing circuit for digitizing the differentiated output into a binary value;

Fourier transform means for Fourier-transforming the binary signal;

a counter for counting the Fourier transform output;

a control circuit supplied with the counted signal and which produces the next focus potential command each time the counting operation completes; and a focus potential generating source for supplying a focus potential to said color Braun tube in response to said focus potential command;

whereby an adjustment is made to provide the best focus point where the counter output becomes the maximum.

* * * * *